(12) United States Patent
Wentworth et al.

(10) Patent No.: US 7,086,808 B2
(45) Date of Patent: Aug. 8, 2006

(54) METHOD AND APPARATUS FOR ON-GRADE BORING

(75) Inventors: Steven W. Wentworth, Brookfield, WI (US); Robert F. Crane, Oconomowoc, WI (US); Mark D. Randa, Summit, WI (US)

(73) Assignee: Earth Tool Company, L.L.C., Oconomowoc, WI (US)

( * ) Notice: Subject to any disclaimer, the term of this patent is extended or adjusted under 35 U.S.C. 154(b) by 99 days.

(21) Appl. No.: 10/327,601

(22) Filed: Dec. 20, 2002

(65) Prior Publication Data

US 2003/0152428 A1    Aug. 14, 2003

Related U.S. Application Data

(60) Provisional application No. 60/343,148, filed on Dec. 20, 2001.

(51) Int. Cl.
 *E03F 3/06* (2006.01)
(52) U.S. Cl. ..................................... 405/184; 405/184.3
(58) Field of Classification Search ............. 405/184.1, 405/184.2, 184.3, 184, 183.5; 138/98, 99; 175/53, 61; 5/184, 184.1, 184.2, 184.3, 183.5
See application file for complete search history.

(56) References Cited

U.S. PATENT DOCUMENTS

| | | | |
|---|---|---|---|
| 4,024,721 A | 5/1977 | Takada et al. ............... 405/184 |
| 4,507,019 A * | 3/1985 | Thompson ................ 405/184.3 |
| 4,784,230 A * | 11/1988 | Cherrington et al. ......... 175/61 |
| 4,907,658 A | 3/1990 | Stangl et al. ................. 175/19 |
| 4,953,638 A | 9/1990 | Dunn ........................... 175/61 |
| 4,983,071 A | 1/1991 | Fisk et al. ............... 405/184.3 |
| RE33,793 E | 1/1992 | Cherrington et al. ....... 172/346 |
| 5,098,225 A | 3/1992 | Rockower et al. .......... 405/156 |
| 5,171,106 A | 12/1992 | Rockower et al. .......... 405/156 |
| 5,306,101 A | 4/1994 | Rockower et al. .......... 405/154 |
| RE35,271 E | 6/1996 | Fisk et al. ............... 405/184.3 |
| 5,580,188 A * | 12/1996 | Nowak ........................ 405/184 |
| 5,651,639 A * | 7/1997 | Wentworth et al. ......... 405/184 |

(Continued)

OTHER PUBLICATIONS

Miller Xpandit brochure on Trenchless Pipe Replacement, Miller Pipeline Corporation, 1994 (8 pages).*

(Continued)

*Primary Examiner*—Suzanne Dino Barrett
*Assistant Examiner*—Gay Ann Spahn
(74) *Attorney, Agent, or Firm*—Philip G. Meyers (57) ABSTRACT

A method for installation of an underground pipe includes an initial step of boring a pilot hole through the ground at a predetermined grade angle by extending a drill string having a steerable boring bit mounted thereon through the ground. Upon reaching an end location for the pilot hole, the bit is removed from the drill string, and an expander having a diameter greater than the pilot hole is attached to the drill string, which expander is backed by an impact device such as a pneumatic impactor including a striker that delivers repeated impacts to a rearwardly facing surface of the expander, and by a pipe drawn along behind the expander. The expander is pulled back through the pilot hole at the grade angle while the impactor is operated to aid progress of the expander through the ground and pull the pipe into place behind the expander. Typically in this method the replacement pipe is coupled to a rear end of the expander and the boring bit has a sonde housing containing a sonde attached thereto to indicate to an operator the orientation of a steering face on the boring bit.

15 Claims, 6 Drawing Sheets

U.S. PATENT DOCUMENTS

| | | | | |
|---|---|---|---|---|
| 5,778,991 | A | 7/1998 | Runquist et al. | 175/61 |
| 5,782,311 | A * | 7/1998 | Wentworth | 175/53 |
| 6,148,935 | A | 11/2000 | Wentworth et al. | 175/398 |
| 6,261,027 | B1 * | 7/2001 | Wentworth et al. | 405/184 |
| 6,269,889 | B1 * | 8/2001 | Wentworth | 173/91 |
| 6,283,299 | B1 | 9/2001 | Lee | 206/760 |
| 6,305,880 | B1 * | 10/2001 | Carter et al. | 405/184.3 |
| 6,390,087 | B1 | 5/2002 | Wentworth et al. | 125/19 |
| 6,411,094 | B1 * | 6/2002 | Gard et al. | 324/326 |
| 6,454,025 | B1 * | 9/2002 | Runquist et al. | 175/61 |
| 6,536,539 | B1 * | 3/2003 | Merecka et al. | 175/62 |
| 6,585,062 | B1 * | 7/2003 | Rozendaal et al. | 175/53 |
| 6,659,198 | B1 * | 12/2003 | Camp | 175/53 |
| 6,668,946 | B1 * | 12/2003 | Rankin et al. | 175/62 |
| 6,682,264 | B1 * | 1/2004 | McGillis | 405/184 |
| 6,755,593 | B1 * | 6/2004 | Wentworth et al. | 405/184.3 |
| 6,761,507 | B1 * | 7/2004 | Wentworth et al. | 405/184.3 |
| 2003/0044238 | A1 | 3/2003 | Wentworth et al. | |
| 2003/0084764 | A1 | 5/2003 | Wentworth | |
| 2004/0028476 | A1 * | 2/2004 | Payne et al. | 405/184 |
| 2004/0184885 | A1 * | 9/2004 | McGillis | 405/184 |

OTHER PUBLICATIONS

Underground Construction, Rehab Product Focus on Trenchless Pipe Replacement, article on Miller Pipeline Bursting System (Circle No. 217) and article on Nowak Pipe Reaming (Circle No. 218), p. 62, Mar. 2004 (1 page).*

"Combined Dry Percussive/Fluid Lubricated Directional Drilling Systems for the Trenchless Installation of Pipes, Ducts & Cables," Steve Vick, www.stevevick.com, 7 pages.

* cited by examiner

METHOD AND APPARATUS FOR ON-GRADE BORING

This application claims priority of U.S. Provisional Patent Application Ser. No. 60/343,148, filed Dec. 20, 2001.

FIELD OF THE INVENTION

This invention relates to methods and systems for the installation of an underground pipelines such as sewer lines using a directional boring machine.

BACKGROUND OF THE INVENTION

It is well known that installing 'on grade' services such as gravity sewer can be very challenging if HDD (Horizontal Directional Drilling) is used as the method of drilling the bore for the pipeline. Typically when these types of pipelines are installed using the open cut method, the pipe is placed, checked for grade, and if necessary, lifted up enough to adjust the grade manually by adding or removing small amounts of bedding material (usually sand or gravel). HDD does not permit fine adjustment after the placement of pipe or any time after the pilot bore is created, therefore the bore path needs to be not only accurate for elevation on each end, but also very straight throughout its length. No opportunity for fine intermediate adjustments is available using currently known HDD methods once the pipe has entered the bore.

Methods and devices disclosed within the scope of this invention will show that if proper care and attention are used with the novel devices described, it is possible to place on grade pipelines using a combination of HDD equipment and optional impact back-reaming technology. In the discussion that follows, "back reaming" is used to refer to the second stage of the process wherein an expander or hole-opener is pulled backward through the pilot hole to widen the pilot hole and optionally pull the new pipeline into place. However, except as discussed below, according to the invention widening the hole to its final size is done by compaction and not by cutting or reaming per se, and thus is not a reaming operation in the strict sense.

SUMMARY OF THE INVENTION

A method for installation of an underground pipe according to the invention includes an initial step of boring a pilot hole through the ground at a predetermined grade angle by extending a drill string having a steerable boring bit mounted thereon through the ground. Upon reaching an end location for the pilot hole, the bit is removed from the drill string, and an expander having a diameter greater than the pilot hole is attached to the drill string, which expander is backed by an impact device such as a pneumatic impactor including a striker that delivers repeated impacts to a rearwardly facing surface of the expander, and by a pipe drawn along behind the expander. The expander is pulled back through the pilot hole at the grade angle while the impactor is operated to aid progress of the expander through the ground and pull the pipe into place behind the expander. Typically in this method the replacement pipe is coupled to a rear end of the expander and the boring bit has a sonde housing containing a sonde attached thereto to indicate to an operator the orientation of a steering face on the boring bit. Preferably the boring bit has an outer diameter that does not substantially exceed the outer diameter of the sonde housing.

According to a preferred form of this method, a cutting back reamer is secured to the drill string ahead of the expander, which cutting back reamer has a maximum outer diameter no more than 90% of the maximum outer diameter of the expander. The drill string and cutting back reamer are rotated during the pulling step independently of the expander and impact device, which do not substantially rotate due to a rotatable connection between the cutting reamer and the expander. The cutting back reamer may be configured to permit steering of the cutting reamer, further comprising correcting deviations from grade by steering using the cutting reamer.

According to another aspect of the invention, a method for installation of an underground pipe includes the steps of boring a pilot hole through the ground at a predetermined grade angle by extending a drill string having a steerable boring bit mounted thereon through the ground, upon reaching an end location for the pilot hole, removing the bit from the drill string and attaching a drill head including a cutting reamer having a diameter greater than the pilot hole to the drill string, which cutting reamer is configured to permit steering when rotated over less than 360 degrees and is backed by a device for pulling a pipe along behind the expander, the device including a rotatable connection whereby the cutting reamer can rotate in unison with the drill string without substantial rotation of the pulling device and pipe, pulling the pipe back through the pilot hole at the grade angle, detecting deviations of the pipe from the grade angle, and steering using the cutting reamer to correct deviations from the grade angle. The cutting reamer preferably has a forwardly tapering, generally conical shape with a cut away steering face on one side thereof, and is mounted non-concentrically relative to the drill string.

The invention further provides an apparatus for installation of an underground pipe. Such as apparatus includes a forwardly tapering cutting back reamer having front and rear connecting portions, wherein the front connecting portion is configured for attaching the cutting back reamer to a drill string for rotation therewith, and the rear connection portion includes a bearing joint, an expander connected to the cutting back reamer by the bearing joint so that the expander does not substantially rotate as the drill string and cutting reamer rotate, which expander has a larger outer diameter than the cutting back reamer and is configured to form a hole by compaction of surrounding soil, and an impact device including a striker that delivers repeated impacts to a rearwardly facing surface of the expander. Suitable means may be provided for pulling a pipe along behind the expander and impact device. These and other aspects of the invention are discussed in the detailed description that follows.

BRIEF DESCRIPTION OF THE DRAWING

In the accompanying drawing, wherein like numeral denote like elements.

DESCRIPTION OF PREFERRED EMBODIMENTS

According to the method of the invention, since directional errors created in the pilot bore are often compounded and exaggerated during any currently known back-reaming operation, any operator attempting an on-grade boring method should remember and emphasize these key factors:

1. Steering corrections to maintain the desired bore path must be made to hold grade as a first priority, not depth below the immediate ground surface, also called depth of cover. Most HDD transmitters are located in transmitter housings that have bits with non-symmetrical projections that create a bore larger than the sonde housing diameter. When drilling is stopped to read the grade of the transmitter, it is not necessarily at rest with its axis collinear to the axis of the bore. Non-symmetrical bit geometry coupled with the oversize bore induce a grade error that can be considered unimportant for conventional HDD boring, but must be accounted for or eliminated in on-grade boring.

2. Steering during pilot hole boring should be done with a bit that is not substantially oversize to the sonde (transmitter) housing behind it. Generally the transmitter housing is larger diameter than the drill string and the bit is larger than the transmitter housing. This geometry enhances the ability to bend the rod within the bore and steer quickly and aggressively, a quality appreciated during conventional HDD operation. As it is never the desire of on grade boring to steer aggressively or radically, it becomes reasonable to reduce the bit size to a diameter approaching that of the sonde housing. This will tend to enhance the goals of the first point outlined above. The primary reason to keep the bore small is to provide a bore that will guide the rod during the back-reaming operation. No steering corrections are normally possible during the back-ream, therefore the pilot hole must be accurate and function to closely guide the back-ream. To accomplish the guiding process, a straight and accurate pilot hole only slightly larger than the drill string rods will assist in keeping the back-reamer on the intended course.

3. The back-reaming process must be controlled so as to minimize wander during the pullback. Wander is exacerbated by changing ground conditions, by short reamers and by reamers that are cone shaped and tend to be forced off their path by cobble stones or other randomly placed obstructions. Even if the reamer used (whether impact assisted or of conventional style) is configured to be long in its body length and not of conical shape, care must be taken during its launch into the bore. The designs that will be discussed tend to go straight and do not respond to applied forces quickly, such as the undesirable forces of cobble stones or ground condition variation, or the desirable force provided by the rod. Therefore the reamer should be launched into the pilot bore with the reamer axis and the pilot bore coaxial to each other. This may require a starter or launch pit that has preparation qualities similar to that which would be used to lay on grade pipe. One notable difference is the length of this bedded pit, it need only be as long as the reamer, rather than the length of the entire pipe installation.

Conventional pneumatic impact moles are generally designed to traverse a straight path along the length of their bore. Three design considerations help achieve this:

1. Making the ratio of body length to bore diameter greater tends to stabilize the mole. As an example, a 2.5 inch diameter pneumatic mole will have an overall length (not including hose) of approximately 48 inches, the bore diameter is 2.6 inches, giving a ratio of (48.0/2.6) or 18.5 to 1. This is recognized as an accurate and stable design even without the advantage of an accurate pilot hole to follow. Typically reamers used in HDD have an aspect or length to diameter ratio of 2 or 3 to 1. Use of an 18.5 to one ratio may not be reasonable for typical on grade bore for 8.62" diameter pipe, however ratios of 3.5 to 1 or even 7 to 1 can yield a usable and effective reamer and are preferred for use in the invention.

2. Use of an active (axially movable) head, such as described in U.S. Pat. No. 6,273,201, the entire contents of which are incorporated by reference herein, reduces the tendency of a pneumatic impact mole to wander off course during a free, or unguided bore. It allows the body to stay stationary and not break static friction with the ground while the head accurately punches a bore in a direction exactly along the axis of the elongated body. Static friction between the body and surrounding soil is less likely to result in deflection of the body within the ground. A moving body would more likely deflect as particles are displaced by dynamic friction.

3. Use of a stepped profile head as shown in U.S. Pat. No. 6,273,201 tends to result in a lower reaction force vectors not aligned with the bore axis. These radial reaction components, produced by randomly placed cobble stones or changing ground conditions will have a significant effect on deviating the path of the mole. By limiting their magnitude, the mole will tend to maintain its straight course. This same physics applies to an impact device when attached to an HDD drill string.

According to the invention, one, two or preferably all three of these features are incorporated into the back reamer to be used for on-grade boring.

Devices currently used to back ream generally function to cut the soil about the pilot bore, mix it with a drilling fluid such as bentonite, and flow the mixed cuttings from the bore. This method is very functional for non-precision bores and has been used to install hundreds of thousands of miles of buried pipe within the last fifteen years. However, only a small percentage of these pipes were specified to have a specific and tightly toleranced grade; usually a specification only calls for a range of depth of cover. The pipe in such a loosely specified installation will typically have both positive and negative slopes over a short distance. While pressurized product flows well through these pipes, gravity induced flow (sewer) needs a constant and narrowly defined negative slope in the direction of intended flow. Water flows downhill, any loss in velocity due to a flat or positive slope will result in loss of velocity. Excessive slope will result in a high water velocity. Both are equally deleterious to the ability to carry solid matter and will ultimately result in flow obstruction and system failure. As a result, the typical grade for an on-grade sewer line installation according to the invention is in the range of about 0.1 to 5 degrees, preferably 0.1 to 3 degrees, and remains constant over the entire run of the pipeline. Storm sewers are similarly graded.

HDD has many benefits, most notably minimal disruption of the surface over which the pipes or utilities are placed. Its weakness has been its inability to install pipes for gravity-induced flow, or on grade bores. The device and method of the invention outlined below eliminates that weakness.

Figure 1:
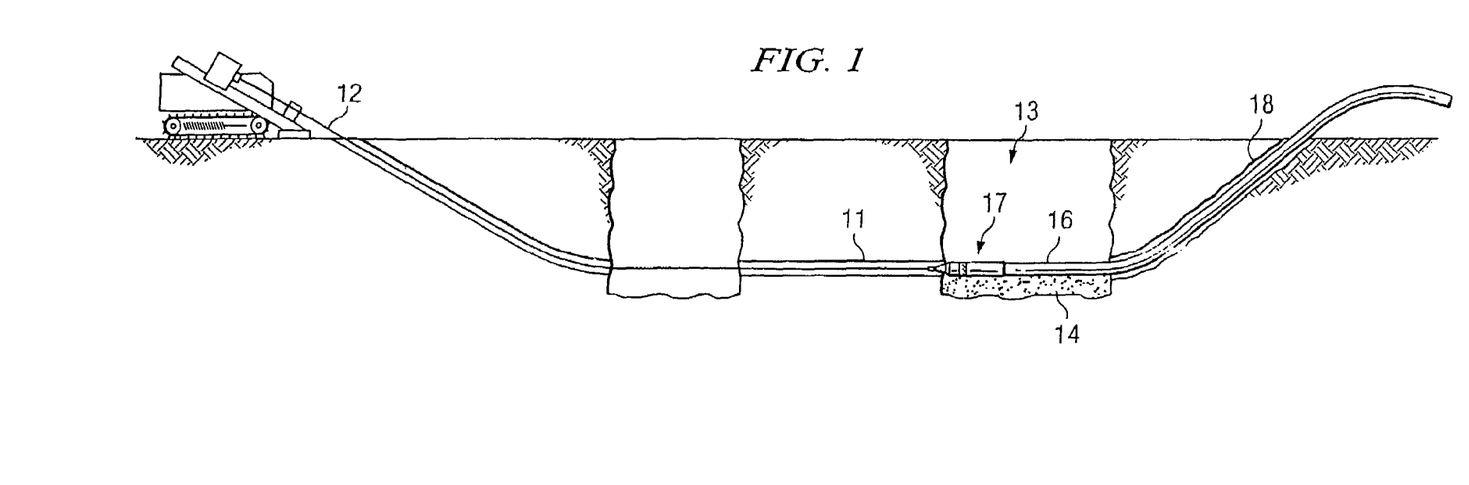
FIG. 1 is a schematic diagram of a back reaming operation according to the invention.

Referring to FIG. 1, after completing an on grade pilot bore 11, preferably using the bit-transmitter housing arrangement described above wherein the bit is the same diameter or only very slightly larger diameter than the sonde housing at the front end of a drill string 12, an accurate reamer launch pit 13 must be prepared. This pit 13 will be coaxial with the pilot bore 11 and have a slope at the nominal value of the specified slope. The bottom is preferably filled with a compactable material such as gravel, and be compressed and tamped to provide a stable base 14. The pit 13 will be long enough so that the product pipe 16 (preferable high density polyethylene or HDPE) bend radius is loose enough to not lift the tail of a reamer 17 from the launch pit base 14. If desired, an angled approach bore 18 can be used to bring the product pipe 16 to the pit 13 at the desired angle.

The reamer 17 will be an impact device, preferably actuated by compressed air, though a hydraulic or a shaft-powered impactor (driven by rotation of the drill string, such as described in U.S. Pat. No. 5,782,311, issued Jul. 21, 1998, the entire contents of which are incorporated by reference herein) may also be used to power the impactor. The reamer body will be long, and if the length engaged by the ground is designated the effective length, the ratio of effective length to bore diameter should be at least about 3.5 to 1, with a ratio of in the range of 3.5:1 to 7:1 being preferred.

Figure 2:
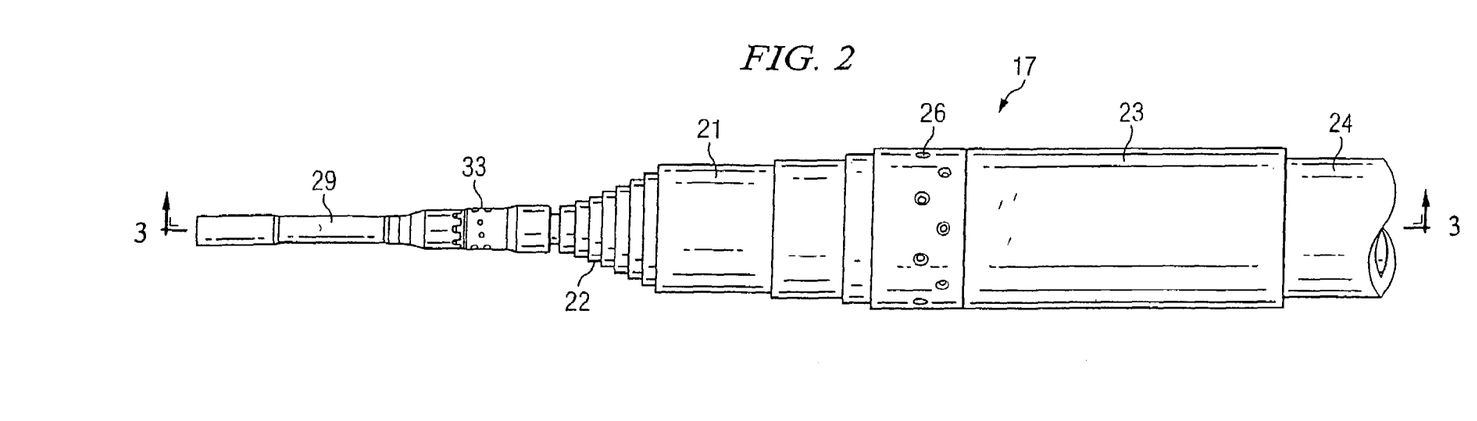
FIG. 2 is a side view of a first apparatus according to the invention.
Figures 3, 4, 5:
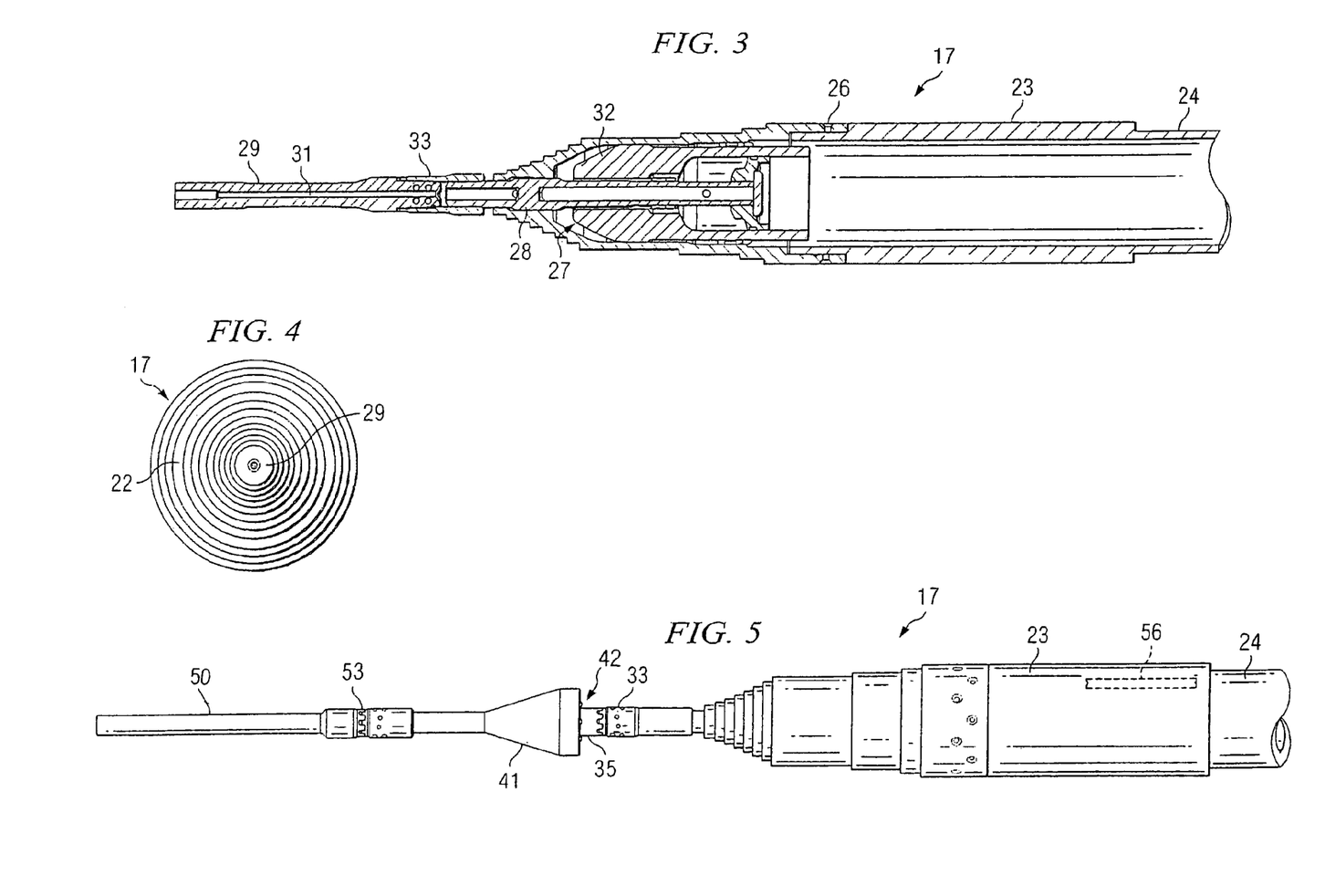
FIG. 3 is a cross section taken along the line 3—3 in FIG. 2.
FIG. 4 is a front view of the embodiment of FIG. 2.
FIG. 5 is a side view of a second apparatus according to the invention.

As shown in FIGS. 2–4, an expander or head 21 of the impact reamer 17 is preferably made to impact the soil in a manner that is decoupled from the drill rod axially, and only in the direction of intended travel. "Decoupled" in this instance means the head moves forwardly relative to the drill string in response to the impact from the impact tool without transmitting more than a small fraction of the impact to the drill string. The head 21 preferably has an annular stair-stepped front profile 22. The elongated body, being included in the effective length, may be merely a sleeve 23 comprised of HDPE trailing the head 21. It can be part of the pipe 24 or fused thereto, and serves as the member that functions to maintain alignment of the impact hole opener. Sleeve 23 is secured to head 21 by shear bolts set through holes 26 at the rear end of head 21.

The impact mechanism 27 operates in substantially the same manner as described in commonly-owned U.S. Ser. No. 09/946,081, filed Sep. 4, 2001, the entire contents of which are incorporated by reference herein. (see also, U.S. patent application Ser. No. 2003/0044238, published Mar. 06, 2003, and U.S. Pat. No. 6,761,507, issued Jul. 13, 2004). As described therein, mechanism 27 preferably includes a control spool 28 that opens in response to pulling on the drill string ending in starter rod 29, permitting compressed air from an air passage 31 to enter the mechanism 27 and cause a striker 32 to reciprocate. A pinned joint 33 permits uncoupling of the head 21 from starter rod 29. Pinned joints and adapters used herein are described in more detail in Wentworth et al. U.S. patent application Ser. No. 20010017222, published Aug. 30, 2001, the content of which is hereby incorporated herein by reference.

Figure 6:
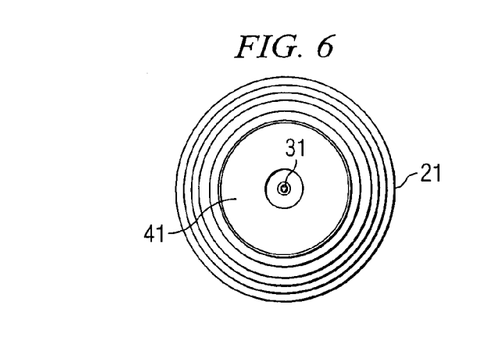
FIG. 6 is a front view of the embodiment of FIG. 5.
Figure 7:
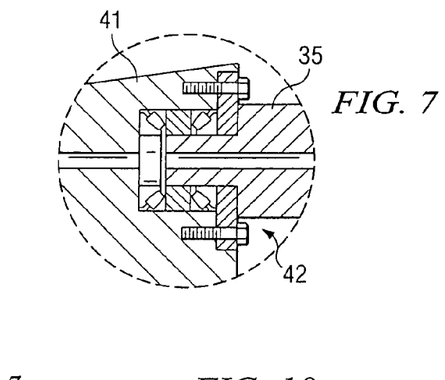
FIG. 7 is a cutaway section view of the bearing referenced in FIG. 5.

A further option according to the invention, as shown in FIGS. 5–6, is to perform a nominal amount of material removal using a cutting reamer 41 that is not unlike those used in conventional methods. This cutting reamer 41, smaller in diameter than the impact reamer 17, would be situated slightly in front of impact reamer 17 and be turned (rotated) by the drill string. A swivel connection such as a tapered roller bearing joint 42 is disposed between the rear of the cutting reamer 41 and the front of the impact reamer 17, preferably ahead of the pinned joint 33 and connected thereto by a bearing adapter 35. The cutting reamer 41 may represent an enlargement of the starter rod and may replace the starter rod in the end-to-end series of components forming the back reamer or hole opener. A starter rod 50 connects cutting reamer 41 to the leading end of the drill string through a further pinned joint 53, and these parts cooperate to supply compressed air for the impact mechanism back through lengthwise passage 31. As an optional component, a sonde 56 may be mounted on the inside of plastic sleeve 31 for measuring the grade angle of the product pipe, and the pipe depth and horizontal position. In this embodiment, exhaust from the impact mechanism passes back through the product pipe 24, typically a water or sewer line.

Figure 8:
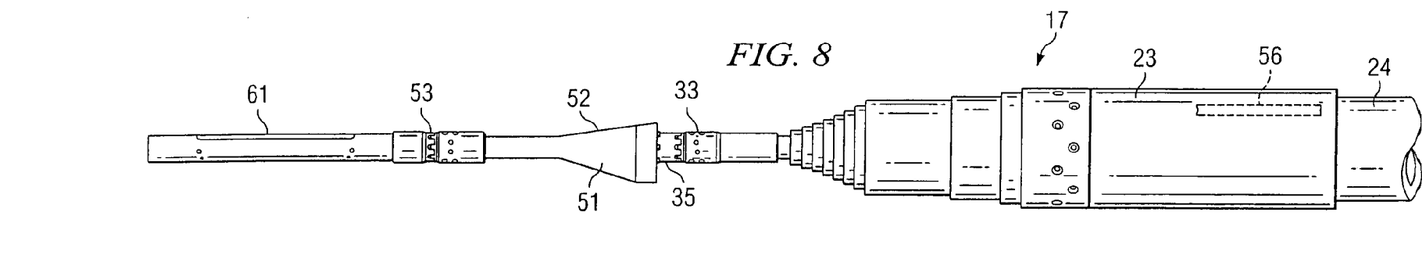
FIG. 8 is a side view of a third apparatus according to the invention.
Figure 9:
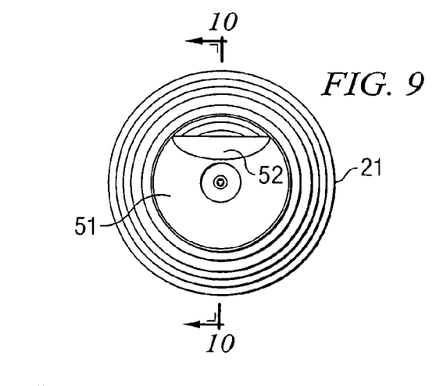
FIG. 9 is a front view of the embodiment of FIG. 8.
Figure 10:
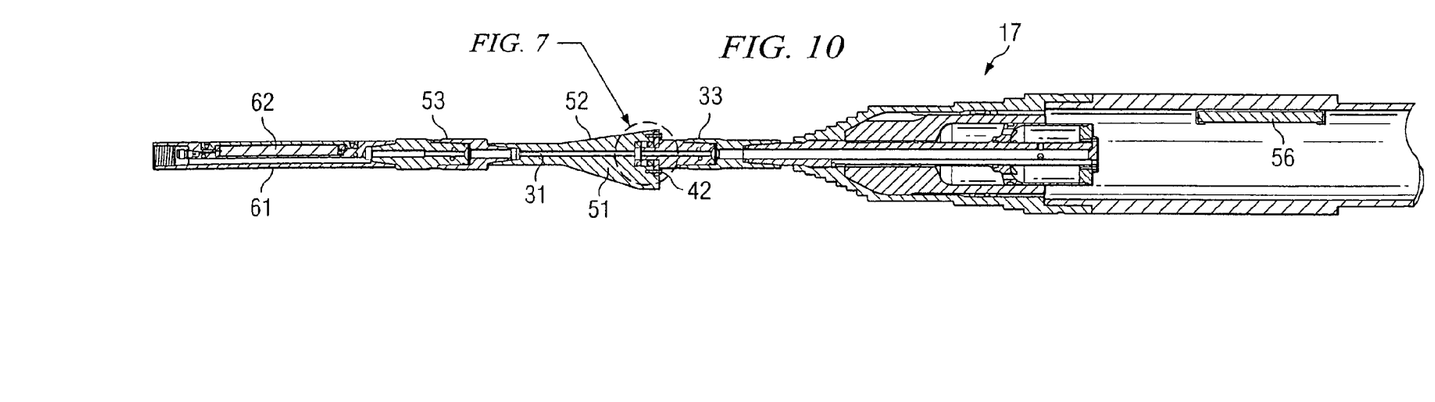
FIG. 10 is a lengthwise section along the line 10—10 in FIG. 9.

Referring now to FIGS. 8–10, use of cutting or disruption of the soil to one side of the instantaneous path of the impact reamer 17 may be used to correct or deviate the path slightly. While the path may not be severely altered, by using a method similar to that used to steer in rock, a void can be created using a non-concentric or asymmetrical cutting reamer. By using a reamer 51 that has a forwardly angled cutaway face 52 on one side, or is generally off center (as by being non-coaxially mounted relative to the drill string), it is possible to create a void just to one side of the rod axis that will serve to change the path of the impact reamer 17 very slightly. The shape of face 52 can vary substantially; it need not be forwardly tapered. The motion of the rod used to steer would include partial rotation of the cutting reamer 51 (say 270 degrees), then returning to the start position by either rotating backwards or pushing the rod back (thereby shutting off the impact reamer 17), and then rotating through the rest of the circle or in the reverse direction. As the impact back reamer 17 always seeks to have a balance of forces acting on it, the partially cut circle, placed off center to the impact reamer, will cause the device to deviate towards the void. This serves to accomplish a minor steering correction.

Such a system would require a conventional HDD sonde to be placed in or around the cutting back-reamer so that its orientation is known to the operator. A sonde housing 61 is mounted ahead of cutting reamer 51 for holding a second sonde 62 that enables the operator to determine the orientation of the cutting reamer 51 for steering purposes. The first sonde 56, in addition to performing the functions described above, can be used in combination with second sonde 62 to measure bending of the apparatus in the ground by comparing grade angle at each location.

Figure 11:
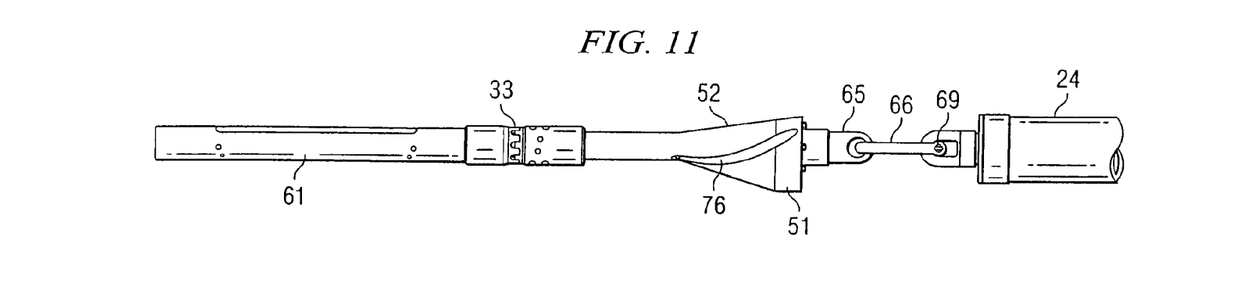
FIG. 11 is a side view of a fourth apparatus according to the invention.
Figure 12:
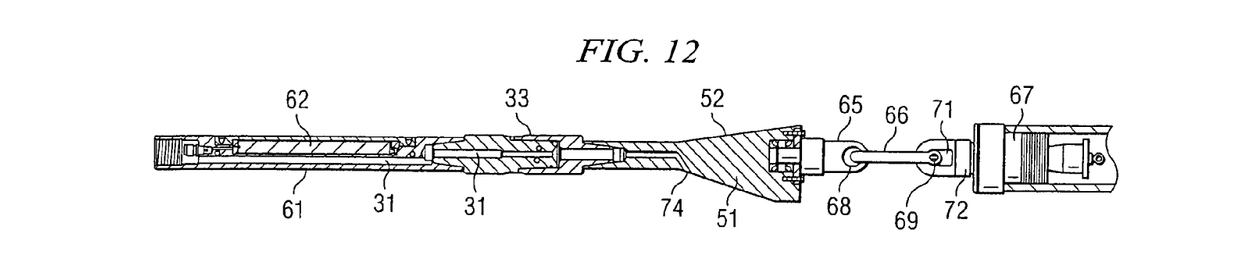
FIG. 12 is the apparatus of FIG. 11, in partial lengthwise section.

The cutting reamer of the invention can also be used by itself, without the aid of an impact reamer, to accomplish on-grade boring. As shown in FIGS. 11 and 12, a rearwardly extending flange 65 on reamer 51 is connected by a U-shaped shackle 66 to a conventional pipe puller, such as an expanded taper pipe puller 67. Shackle 66 is inserted through an eye 68 in flange 65 and secured by means of a bolt 69 through an eye 71 in a frontwardly extending flange 72 of pipe puller 67. Shackle 66 could be replaced by a cable or any similar pulling connector used in the industry. Additionally, it may be desirable to supply the cutting reamer 51 with drilling fluid (such as bentonite) through the hollow drill string. The drilling fluid is ejected from a series of holes 74 on the outer surface of the reamer 51 in a manner well known in the art, which holes communicate with the central passage 31 through the drill head. Cutting reamer 51 may also have teeth and/or spiral grooves (76, FIG. 11) which are effective to enhance cutting action.

Figure 13:
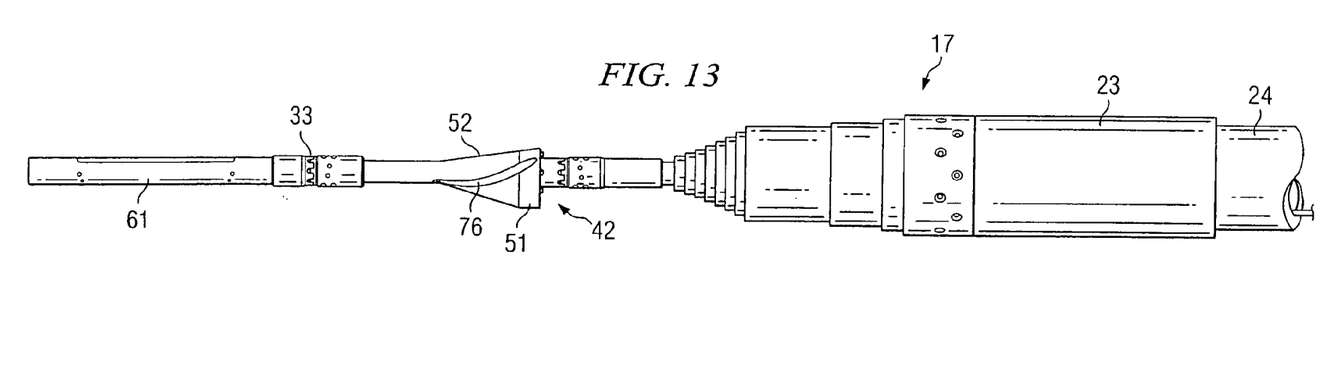
FIG. 13 is a side view of a fifth apparatus according to the invention.
Figure 14:
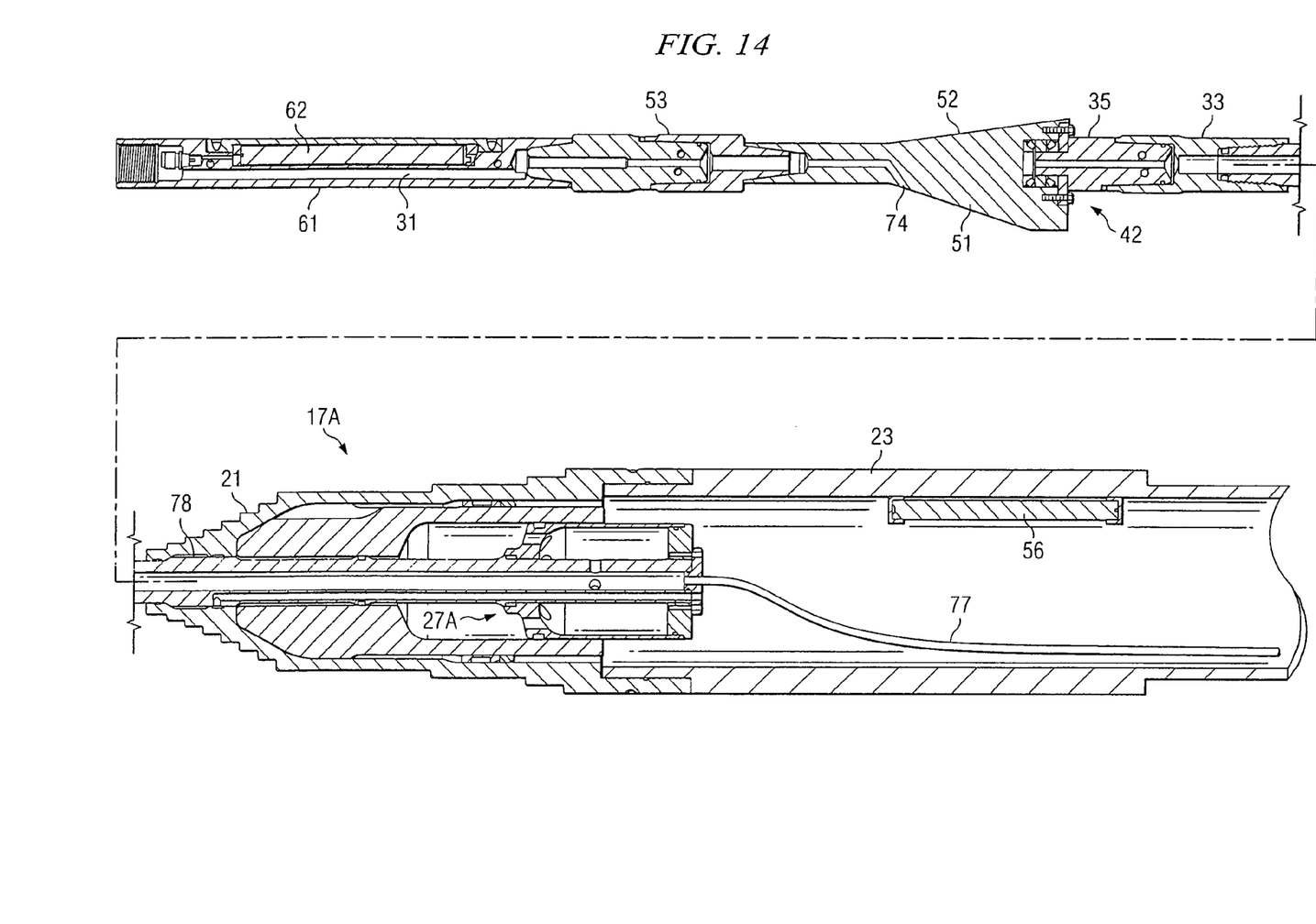
FIG. 14 is a lengthwise sectional view of the apparatus of FIG. 13.

If it is desired to use drilling fluid and a pneumatic impact mechanism as well, the apparatus of FIGS. 13 and 14 can be used. In such a case, since the drill string cannot then be used to conduct compressed air, air is conveyed to a modified impact mechanism 27A from the rear using a hose 77 extending through the product pipe 24, such as described in connection with the embodiment of FIGS. 20–26 in the foregoing U.S. Ser. No. 09/946,081, filed Sep. 4, 2001. Should a cutting reamer be used with the impact reamer, the impact reamer 17A of this embodiment can make use of an integral, self regulating on-off switch or device 78 that would prevent the impact reamer from overtaking or impacting the cutting reamer. In some cases, the resistance of the ground itself will act to prevent the impact reamer from traveling too far forward. The connection between the cutting reamer 51 and impact reamer 17A may be designed to permit a certain amount of relative movement, for example, by interposing a shackle, cable or elastomeric link therebetween so that limited forward movement of the impact reamer can occur relative to the cutting reamer.

It is also advantageous for purposes of the invention to use an active head that is axially decoupled from both the rod and the elongated body of the impact reamer. Since the head moves in small increments per impact and the stroke of the head with respect to the elongated body is limited, eventually the impact is applied to the body, moving it forward to meet the head. This has the advantage of keeping the body static during most of the applied impact, thereby enhancing straight reaming. This is accomplished, for example, by using a tool such as the one described in the foregoing U.S. Pat. No. 6,273,201 as the impact reamer, or one having a similar movable chisel or head.

Figure 15:
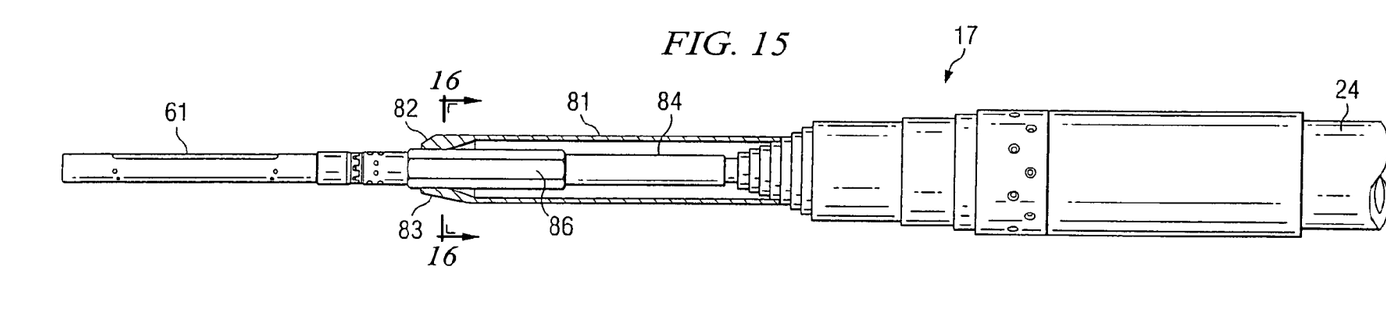
FIG. 15 is a side view of a sixth apparatus according to the invention.
Figure 16:
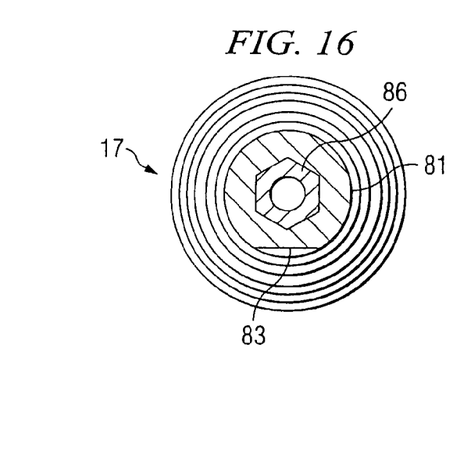
FIG. 16 is a cross-sectional view along the line 16—16 in FIG. 15.

A further variant of the invention is shown in FIGS. 15 and 16, wherein the cutting reamer is replaced by a can or tubular steerable expander 81 that protects the device from dirt. The front end of expander 81 can have a conical profile 82 with a cutaway steering face 83, so that expander 81 can be used to steer in much the same manner as reamer 51, but without a cutting action. A rotary bearing 84 similar to bearing 42 is disposed inside a shaft or mounting adapter 86 connected to the front end of the impact reamer, which in this embodiment has a larger diameter than the steerable reamer. An external hex surface of adapter 86 rotates expander 81 in unison with the sonde housing and drill string.

In all but one of the concepts described herein, the hole is sized using compaction rather than cutting. Cutting as illustrated above is preferably employed as a means of reducing the amount of work needed to be done by compaction, but ultimately the most stable, straight and accurate bore is made by using impact compaction. The head preferably creates a hole slightly oversize to the product pipe to limit pipe friction. The amount of oversize, derived from experience in pipe bursting activity using impact compaction methods, should produce a hole diameter 12% to 20% greater than the outer diameter of the pipe. An excessively oversize hole will result in loss of grade tolerance, whereas insufficient oversize will limit the length of pipe installed per bore.

Approximately 80% of the pipe and conduit being placed currently in the U.S. is not grade sensitive. The other 20% is currently normally installed with open digging methods, resulting in disruption, danger and significant surface restoration efforts. The ability to do that 20% within the required tolerances is now possible in accordance with the invention using impact compaction methods coupled with HDD equipment and processes. In particular, the present invention achieves several unique advantages, including:

(1) hole upsizing while maintaining pilot bore grade and line using impact compaction coupled to a directional drill;

(2) hole upsizing while maintaining pilot bore grade and line using impact compaction coupled to a directional drill having the impactor decoupled from the drill string in an axial direction and along the direction of intended travel;

(3) hole upsizing while maintaining pilot bore grade and line using an air impact compaction reamer coupled to a directional drill having a self-regulating valve system.

(4) hole upsizing while maintaining pilot bore grade and line using impact compaction directly behind a smaller cutting reamer coupled to a directional drill and having a self-regulating valve system;

(5) hole upsizing while maintaining pilot bore grade and line using impact compaction coupled to a directional drill where the elongated body has a length to diameter ratio of 3.5 to one or more;

(6) Use of a drill bit that bores a hole diameter 20% or less oversize to the transmitter housing and or rod or rod upset diameters for the purpose of maintaining a straight bore path during creation of the pilot bore without giving up all ability to steer; and (7) A method of using a non axi-symmetric shaped reamer rotated through less than 360 degrees and returned to its starting position for one or more cycles, thereby creating a cavity off set to the axis of the drill string, the purpose being to deviate the path of any sort of hole opening device, preferably an impact reamer.

The invention as such includes the foregoing, as well as those defined more specifically in the claims that follow.

The invention claimed is:

1. A method for installation of an underground pipe, comprising
   boring a pilot hole through the ground at a predetermined grade angle by extending a drill string having a steerable boring bit mounted thereon through the ground;
   upon reaching an end location for the pilot hole, removing the bit from the drill string and attaching an expander having a diameter greater than the pilot hole to the drill string, wherein the expander is backed by an impact device including a striker that delivers repeated impacts to a rearwardly facing surface of the expander, and by a pipe drawn along behind the expander; and
   pulling the expander back through the pilot hole at the grade angle while operating the impact device to aid progress of the expander through the ground and pulling the pipe into place behind the expander.

2. The method of claim 1, wherein the pipe is coupled to a rear end of the expander.

3. The method of claim 1, wherein the grade angle is in the range of 0.1 to 5 degrees.

4. The method of claim 1, wherein the boring bit has a sonde housing containing a sonde attached thereto to indicate to an operator the orientation of a steering face on the boring bit, and the boring bit has an outer diameter that does not substantially exceed the outer diameter of the sonde housing.

5. The method of claim 1, wherein the expander moves forwardly over a short distance in response to an impact from the striker without transmitting any substantial impact force to the drill string.

6. The method of claim 1, further comprising:
securing a cutting back reamer to the drill string ahead of the expander, wherein the cutting back reamer has a maximum outer diameter no more than 90% of the maximum outer diameter of the expander;
rotating the drill string and the cutting back reamer during the pulling step independently of the expander and the impact device, which do not substantially rotate due to a rotatable connection between the cutting back reamer and the expander.

7. The method of claim 6, wherein the cutting back reamer is configured to permit steering of the cutting back reamer, further comprising correcting deviations from grade by steering using the cutting back reamer.

8. The method of claim 7, wherein the impact device is a pneumatic impactor, further comprising supplying compressed air to the impactor through a lengthwise flow passage in the drill string, the cutting back reamer and the expander.

9. The method of claim 7, further comprising:
supplying a drilling fluid through the drill string, wherein the fluid flows through a flow passage in the cutting back reamer out into surrounding soil; and
wherein the impact device is a pneumatic impactor, further comprising supplying compressed air to the impactor through a hose disposed in the pipe.

10. A method for installation of an underground pipe, comprising
boring a pilot hole through the ground at a predetermined grade angle by extending a drill string having a steerable boring bit mounted thereon through the ground;
upon reaching an end location for the pilot hole, removing the bit from the drill string and attaching a drill head including a cutting reamer having a diameter greater than the pilot hole to the drill string, wherein the cutting reamer is configured to permit steering when rotated over less than 360 degrees and is backed by a pulling device for pulling a pipe along behind an expander, the pulling device including a rotatable connection whereby the cutting reamer can rotate in unison with the drill string without substantial rotation of the pulling device and the pipe;
pulling the pipe back through the pilot hole at the grade angle;
detecting deviations of the pipe from the grade angle; and
steering using the cutting reamer to correct deviations from the grade angle.

11. The method of claim 10, wherein the drill head includes an expander having a diameter greater than the diameter of the cutting reamer, wherein the expander is backed by an impact device including a striker that delivers repeated impacts to a rearwardly facing surface of the expander effective to form a hole for the underground pipe by compaction.

12. The method of claim 11, wherein the pipe is coupled to a rear end of the drill head.

13. The method of claim 10, wherein the grade angle is in the range of 0.1 to 5 degrees.

14. The method of claim 10, wherein the cutting reamer has a forwardly tapering, generally conical shape with a cut away steering face on one side thereof.

15. The method of claim 10, wherein the cutting reamer has a forwardly tapering, generally conical shape and is mounted non-concentrically relative to the drill string.

* * * * *